UNITED STATES PATENT OFFICE.

JOHN M. WILSON, OF MONTCLAIR, NEW JERSEY, AND CHARLES N. FORREST, OF BROOKLYN, NEW YORK, ASSIGNORS, BY MESNE ASSIGNMENTS, TO WILSON REMOVER COMPANY, OF NEWARK, NEW JERSEY, A CORPORATION OF NEW JERSEY.

PAINT AND VARNISH REMOVER.

1,173,628.

Specification of Letters Patent.  Patented Feb. 29, 1916.

No Drawing.   Application filed December 20, 1906.  Serial No. 348,808.

*To all whom it may concern:*

Be it known that we, JOHN M. WILSON and CHARLES N. FORREST, citizens of the United States, and residents, respectively, of Montclair, New Jersey, and of Brooklyn, in the State of New York, have invented certain new and useful Improvements in Paint and Varnish Removers, of which the following is a specification.

In the production of paint and varnish removers, as distinguished from analogous yet dissimilar waterproof cements and waterproofing compounds which are in reality a species of varnish, it is essential to produce an extremely slow-drying mixture, capable of yielding a soft, wax-like film which has little or no affinity for the underlying surface, whereby its removal therefrom can be readily effected.

Our invention relates to improvements in that class of paint and varnish removers which contain wax-like compounds either in solution or in suspension therein and has for its object the production of a mixture which evolves non-combustible vapors, which is capable of producing a soft, yet extremely tenacious and impervious film upon the superficial evaporation of the solvent thereof and which is stable and does not deposit wax when stored.

The paint and varnish removers heretofore produced which contain wax-like compounds therein, soon deteriorate, especially in the cold, owing to the gradual deposition of the waxy particles at the bottom of the solution, with the result that the supernatant liquid is clear and practically free from wax. The finely precipitated wax of many mixtures now in use, suspended therein, is also objectionable owing to the fact that in practice it not only settles upon and coats the surfaces to be treated, thus tending to prevent the contact of the alcoholic solvent with the varnished surface, but it settles in and clogs up the pores of the wood and the removal of the wax becomes as difficult as the removal of the original varnish without the agency of a paint and varnish remover.

Our experiments have led to the discoveries that if the relative quantities of the components of the mixture be suitably apportioned, a clear solution of alcohol, benzol (benzene) and wax can be obtained at temperatures varying between 20° to 32° C.; that the benzol and alcohol can be advantageously replaced by turpentine and acetone or the alcohol alone may be substituted by acetone; that when acetone is substituted for alcohol, the wax in its solid state can be added to a mixture of acetone and turpentine, or acetone and benzol, and readily dissolved therein by warming the mixture, without necessitating the prior solution of the wax in the benzol or turpentine alone; that a clear solution of wax in carbon tetrachlorid, acetone and benzol, or wax in carbon tetrachlorid, acetone and turpentine can be obtained, whereas if alcohol be substituted for the acetone it will not mix with the wax dissolved in benzol and carbon tetrachlorid, but forms a distance layer above the same; lastly, that various thickening agents when dissolved in a paint and varnish remover, prevent the crystallization and deposition of the wax at normal temperatures and thus permit the mixture when applied to act directly upon the varnish, in lieu of indirectly, through an intermediate layer of wax, above noted, since the wax deposits as a film on the surface only of the liquid and occludes the remainder of the same.

In carrying out our invention we prefer to proceed as follows: One quart of acetone and three quarts of benzol (or a mixture of one quart of carbon-tetrachlorid and two quarts of benzol may be substituted for the benzol) are mixed together and to the mixture of acetone with the aforesaid compounds, are added two and one-half ounces of solid paraffin wax and then the mixture is heated by indirect steam preferably to a temperature below 75° C., until solution occurs. If desired, the benzol in both of the mixtures mentioned can be replaced by an equivalent amount of turpentine substantially free from rosin.

When carbon-tetrachlorid is utilized, which enables one to produce a remover that evolves non-combustible vapors, it is preferable to use at least 25% and less than 50% of the liquid mixture and similarly in order to produce an effective remover the acetone should vary between like limits.

In order to prevent the crystallization and separation of the wax in the above mixtures a collodion solution of a specific gravity preferably of .85 to .90 at normal temperatures is thoroughly stirred into the same, the preferred proportions being similar to the amount of wax, i. e., a mixture of four gallons of liquids with two and one-half ounces of wax is treated with two and one-half ounces of collodion. The said collodion solution contains preferably 92.5% of solvent and 7.5% of residue, the solvent preferably comprising acetone and ethyl acetate. The admixture of the collodion solution can be readily accomplished at normal temperatures without resorting to heat.

Our invention also contemplates the formation of an alcoholic paint and varnish remover which does not deteriorate in storage and produces a soft, yet tenacious film upon the superficial evaporation of the solvent thereof. In the preparation of such a mixture we preferably proceed as follows: One quart of alcohol, desirably ethyl or methyl, is gradually added with stirring to a solution of two and one-half ounces of paraffin wax in three quarts of benzol (benzene). To the above mixture at a normal temperature is then added with constant stirring two and one-half ounces of the collodion solution similar to that above described.

The term collodion as herein used includes solutions of nitrated celluloses, preferably gun-cotton in suitable solvents such as acetone and organic esters, as ethyl acetate, or alcohol and said esters.

Owing to the fact that a solution of paraffin wax in carbon-tetrachlorid is non-miscible with either commercial methyl or ethyl alcohol, we do not desire to claim the rendition of paint and varnish removers of such a nature, incapable of yielding combustible vapors due to the use of sufficient carbon-tetrachlorid to render the vapors evolved non-inflammable, but specifically limit the claims to mixtures containing a wax solvent other than carbon-tetrachlorid, acetone or analogous compounds of the "ketone" not "alcohol" group, and sufficient carbon-tetrachlorid to render both of said inflammable liquids non-inflammable.

In addition to the above advantages of our collodion-containing paint and varnish removers, the peculiar viscosity of the same is a property of no little importance, as its value for application to vertical or overhead surfaces is thereby greatly enhanced and not only is there an entire absence of dripping or any tendency to flow downwardly, but the dried film can be more expeditiously removed because of the fact that large shavings can be peeled off without the disintegration of the film into fine chips or powder.

The term wax as used in the specification and claims is generic and includes various waxy bodies, when not otherwise specified, such as mineral vegetable and animal waxes capable of utilization in this art.

Having thus described our invention, we claim:

1. A liquid paint and varnish remover, containing a solvent of wax, other than carbon-tetrachlorid, an active solvent of dried films of paint and varnish, a thickening agent comprising a compound of cellulose, wax, and sufficient carbon-tetrachlorid to render the vapors evolved from the said mixture, non-combustible, said mixture being capable of yielding a soft, yet tenacious, impervious and substantially non-adhesive film, upon the superficial evaporation of the solvent therefrom, substantially as described.

2. A liquid paint and varnish remover, containing turpentine, substantially free from rosin, acetone, wax, and sufficient carbon-tetrachlorid to render the vapors evolved from said mixture, non-combustible, substantially as described.

3. A liquid paint and varnish remover, comprising a clear solution of collodion and wax in a mixture of a wax-solvent and a solvent of dried films of paint and varnish which is not a solvent of wax, substantially as described.

4. A liquid paint and varnish remover, comprising a clear solution of two and one-half ounces of wax, two and one-half ounces of collodion solution, one quart of carbon-tetrachlorid, one quart of an active solvent of dried films of paint and varnish which is not a solvent of wax, and two quarts of a wax-solvent other than carbon-tetrachlorid, substantially as described.

Signed at Long Island City, in the county of Queens and State of New York, this 18th day of December, A. D. 1906.

JOHN M. WILSON.
CHARLES N. FORREST.

Witnesses:
WM. L. WOOD,
B. C. VANDERWATER.